United States Patent [19]

Takata

[11] Patent Number: 5,172,962
[45] Date of Patent: Dec. 22, 1992

[54] BRAKE SYSTEM
[75] Inventor: Koji Takata, Itami, Japan
[73] Assignee: Sumitomo Electric Industries, Ltd., Osaka, Japan
[21] Appl. No.: 887,650
[22] Filed: May 26, 1992

Related U.S. Application Data

[63] Continuation of Ser. No. 563,986, Aug. 7, 1990, abandoned.

Foreign Application Priority Data

[30] Aug. 7, 1989 [JP] Japan .................. 1-205388

[51] Int. Cl.⁵ ............................................. B60T 13/14
[52] U.S. Cl. .................... 303/113 TR; 303/113 SS; 303/115 PP
[58] Field of Search ............... 303/100, 115, 113, 110, 303/93, 119

[56] References Cited

U.S. PATENT DOCUMENTS

| | | | |
|---|---|---|---|
| 4,606,585 | 8/1986 | Farr et al. | 303/92 |
| 4,741,581 | 5/1988 | Krohn | 303/115 |
| 4,836,618 | 6/1989 | Wakata et al. | 303/100 |
| 4,861,115 | 4/1989 | Petersen | 303/DIG. 4 X |
| 4,877,296 | 10/1989 | Leiber et al. | 303/115 SP X |
| 4,904,028 | 2/1990 | Leiber et al. | 303/100 |
| 4,948,200 | 8/1990 | Leiber et al. | 303/100 |
| 4,964,045 | 10/1990 | Iwata et al. | 303/100 |

Primary Examiner—Robert J. Oberleitner
Assistant Examiner—Lee W. Young
Attorney, Agent, or Firm—Wenderoth, Lind & Ponack

[57] ABSTRACT

A brake system having at least one static pressure line having a static pressure generator. The static pressure line has a bilateral driving piston having one end thereof acted on by a brake pressure and the other end acted on by a control pressure, a changeover valve capable of shutting off the fluid flow from the static pressure generator to the wheel brake, a flow control valve for controlling the control pressure of the driving piston, and an electronic control unit for giving a control command to the flow control valve. The driving piston is controlled so as to keep its predetermined neutral position while the manual input is zero, and, in a normal operation phase, so as to move in such a direction as to reduce the capacity of the static pressure line so that a manual control stroke will be shortened in a predetermined relationship with deceleration or with other braking factors closely associated with the deceleration. In an antilock control phase, the driving piston is controlled so as to move in such a direction as to increase the capacity of the static pressure line, after the fluid flow from the static pressure generator to the wheel brake has been shut off by said changeover valve.

9 Claims, 2 Drawing Sheets

BRAKE SYSTEM

This application is a continuation of now abandoned application Ser. No. 07/563,986, filed on Aug. 7, 1990.

BACKGROUND OF THE INVENTION

1. Field of the Invention

This invention relates to a brake system for a vehicle which satisfies requirements such as safety, sophisticated control, improved pedal feeling and reduction in cost.

2. State of the Prior Art

If a large effective sectional area of a static pressure generator, i.e. a master cylinder, is adopted to reduce the pedal stroke, and a consequent increase in the pedal force is compensated for by an appropriate booster, the pedal force in the failure of a dynamic pressure source will become extremely large.

On the other hand, the reduction of the sectional area in an attempt to lighten the pedal force will bring about an increase in the pedal stroke. In both cases, the pedal feel is unsatisfactory.

The present applicant proposed in Japanese Patent Application 1-85176 a brake system which can attain both the shortening of the pedal stroke in normal conditions and the lightening of the pedal force in case of the failure of the dynamic pressure line, and furthermore enables the relation between the pedal stroke and the deceleration to be set in any desired manner. In this brake system, pressure fluid from the dynamic pressure source is introduced to the static pressure line and the pressure fluid in the static pressure line is discharged into a reservoir by executing electronic control so that the pedal stroke and the vehicle deceleration will be in a predetermined relationship with each other.

The prior art system was unsatisfactory in that:

1) If even a very small amount of pressure fluid should leak through a flow control valve while the supply of pressure fluid from the dynamic pressure source to the static pressure line ceases due to a failure in the dynamic pressure line or the electronic control, the pressure fluid in the static pressure line might leak out gradually while braking. In order to assure safety, it is necessary to provide some means for preventing such a leakage.

2) If the static pressure line shows a partial failure, that is, if a medium degree of leakage takes place, the pressure fluid of the dynamic pressure source might be consumed to a considerable degree before the leakage is detected.

3) If a flow-variable control valve is used to upgrade antilock control, it is necessary to provide an extra flow-variable control valve for the stroke control. This will increase the cost.

SUMMARY OF THE INVENTION

An object of this invention is to provide a brake system in which a means for shortening the pedal stroke in normal conditions and also lightening the pedal force in dynamic pressure line failure conditions is combined with an antilock control means and an automatic braking means, such as a traction control means.

It is a well-known antilock control method to separate a static pressure line from a dynamic pressure source by use of a unilateral driving piston which can increase the capacity of the static pressure line (e.g. U.S. Pat. No. 4,606,585).

The brake system according to the present invention will be more easily understood if we consider that one of its driving pistons is made bilateral and performs the function of both reducing the capacity of the static pressure line to shorten the pedal stroke and also increasing the capacity of the static pressure line to reduce the brake pressure for antilock.

Namely, in this invention, the bilateral driving piston has one end open to the brake pressure and the other end to the control pressure. The piston is held in a predetermined neutral position during a non-control phase wherein the manual input is approximately zero. In a normal control phase, the capacity of the static pressure line is controlled to decrease so that the input control stroke will shorten, maintaining a predetermined relationship with respect to the deceleration or the other braking factors closely related thereto. During antilock control, the fluid flow from a static pressure generating device to a brake circuit is shut off by means of a solenoid valve provided to prevent backflow, and the bilateral driving piston is controlled in such a direction as to increase the capacity of the static pressure line, adjusting the control pressure by means of a flow control valve.

The bilateral driving piston should be returned to its neutral position during the non-control phase:

1) by providing a position sensor to detect at least the neutral position of the bilateral driving piston and move the driving piston to the neutral position by means of the flow control valve according to the sensor signal, or 2) by providing a spring to push the bilateral driving piston back to its neutral position when the brake pressure is approximately equal to the control pressure and control the flow control valve so that the control pressure should become zero, when the brake pressure is zero, thus allowing the piston to move back to its neutral position with the spring force.

When moving the bilateral driving piston in such a direction as to reduce the capacity of the static pressure line in normal conditions, it may be controlled so as to maintain a predetermined relationship between:

(a) the manual control stroke and the deceleration of the vehicle, (b) the stroke of the driving piston and the vehicle deceleration, (c) the stroke of the driving piston and the manual control stroke, or (d) the stroke of the driving piston and the manual control force or the fluid pressure (in the static pressure line or the dynamic pressure line), which is proportional to the manual control force.

In any case, in normal conditions, the manual control stroke is eventually shortened so as to be in a predetermined relationship with the deceleration. Namely, though the manual control stroke is not directly related to the deceleration if a relation other than the relation (a) is selected, the manual control stroke is considered to be indirectly and roughly related to the deceleration, since such braking factors as the stroke of the driving piston, the manual control force and the pressure proportional to the manual control force are closely related to the deceleration.

A stroke sensor capable of detecting the amount of reduction in the capacity of the static pressure line can be used as a position sensor. In that case, the amount of reduction in the capacity of the static pressure line can be directly controlled by the pedal stroke, taking advantage of the relation (c). It is also possible to omit a pedal stroke sensor for detecting the stroke of a pedal or a member associated therewith by utilizing the relation (b) or (d) (if the relation (d) is used, a pressure sensor has to be provided). Advantageously, a common sensor may be used rather than using separate sensors to detect the neutral position and the reduction in the capacity of the static pressure line.

If the stroke sensor for the driving piston is capable of detecting the increase in the capacity of the static pressure line, antilock control will become easier and failure can be detected more effectively.

If the bilateral driving piston is returned to its neutral position by use of a spring, not by the stroke sensor, the size and cost of the system will be reduced. In this case, the relation (a) is used in controlling the reduction in the capacity of the static pressure line. Of course, the relations (b)-(d) can be used if a stroke sensor for the driving piston is used in combination with the spring.

Further, by providing a second solenoid valve for preventing backflow during automatic braking from the brake circuit, including the bilateral driving piston to the static pressure generator, i.e. the master cylinder piston, automatic brake control such as traction control is possible with the same flow-variable control valve.

The present invention is applicable to a system in which one of its lines is a static pressure line and the other is a dynamic pressure line, or to a system having a tandem master cylinder, thus having two static pressure lines. Namely, the present invention is applicable to a system having a fluid pressure booster as well as a system having a vacuum booster.

If a tandem master cylinder is used, it is possible to provide a bilateral driving piston in only one of the static pressure lines near a pedal push rod.

If a plurality of brakes are coupled to one of the static pressure lines, a bilateral driving piston may be provided for one brake only while providing the other brakes with simple unilateral driving pistons for antilock control only. But if the function of traction control is added, the brakes for all the driving wheels have to be provided with bilateral driving pistons.

By reducing the capacity of the static pressure line in normal conditions by means of the bilateral driving piston, the pedal stroke can be shortened without increasing the effective sectional area of the master cylinder, which in turn gives a lighter pedal force in case of a failure in the dynamic pressure line.

Also, since the brake circuit in the static pressure line provided with the bilateral driving piston is a closed circuit separated from the dynamic pressure line, above problems 1) and 2) will be obviated.

Further, since a single flow control valve for adjusting the control pressure can be used both for increasing and reducing the capacity of the static pressure line, problem 3) is obviated.

This arrangement further makes it possible to upgrade the antilock control with a smaller number of components. Thus the brake system according to this invention is high in performance and reliability and advantageous in cost.

BRIEF DESCRIPTION OF THE DRAWINGS

Other features and objects present invention will become apparent from the following description taken with reference to the accompanying drawings, in which.

DETAILED DESCRIPTION OF THE PREFERRED EMBODIMENTS

Figure 1:
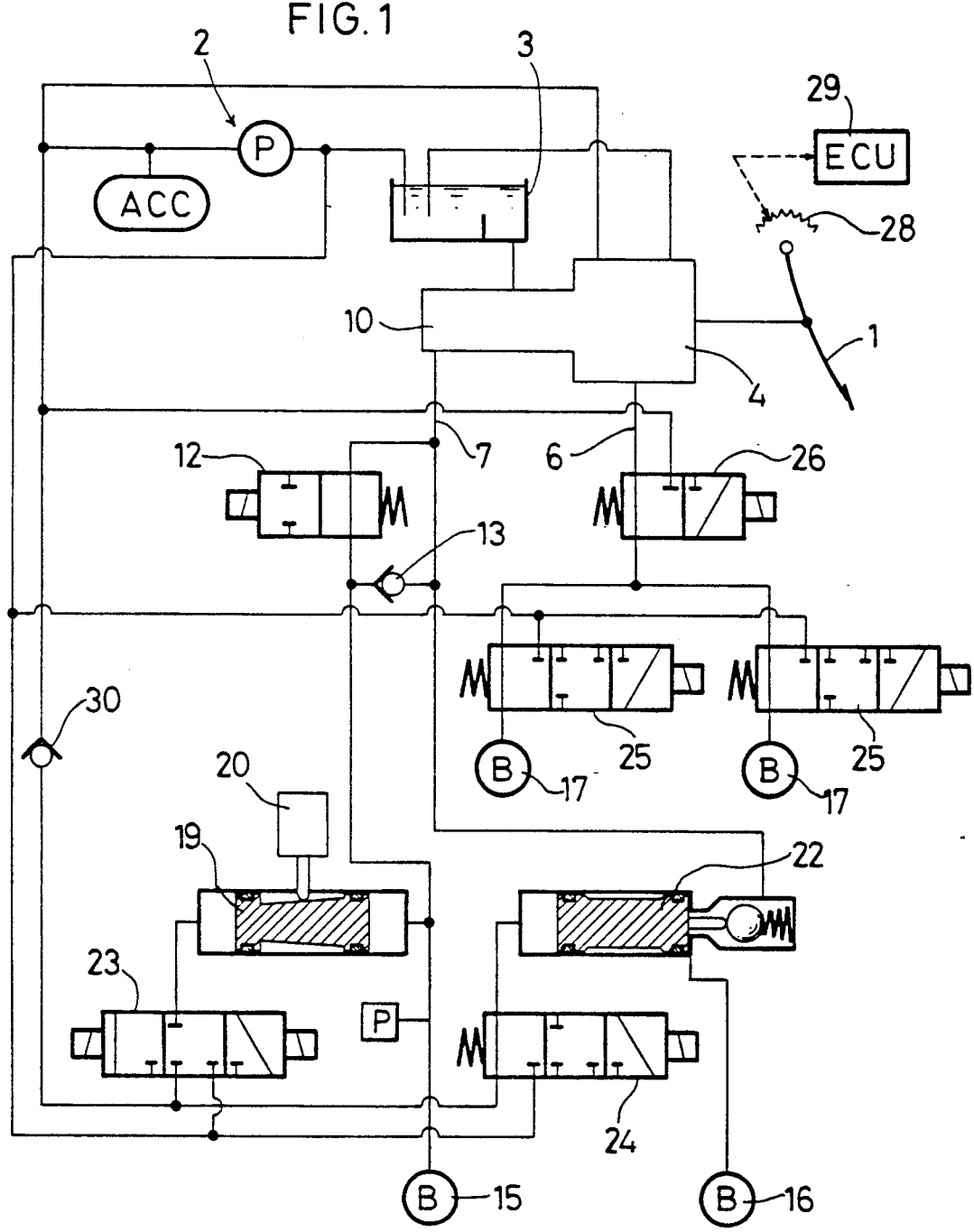
FIG. 1 is a circuit diagram of a first embodiment according to the present invention.

FIG. 1 shows a brake system utilizing a dynamic pressure from a fluid pressure booster in one line. By depressing a pedal 1, a dynamic pressure is given to a dynamic pressure line 6 after being adjusted by a booster 4 connected to a reservoir 3 and a dynamic pressure source 2 comprising a pump, a check valve, an accumulator and a pressure switch. At the same time, a static pressure substantially equal to the dynamic pressure is given from a (single) master cylinder 10 to a static pressure line 7.

The pressure in the static pressure line is introduced into a wheel brake 15 through an antilock changeover valve 12 (including a check valve 13 arranged in parallel).

A bilateral driving piston 19, is connected to the wheel brake 15. In this embodiment, it has a stroke sensor (or position sensor) 20. The driving piston 19 is driven by a fluid flow through a flow control valve 23 adapted to be closed in both ways in its inoperative conditions.

For another wheel brake 16, a unilateral driving piston 22 is provided solely for antilock control and is driven by fluid flow through a flow control valve 24 which is adapted to be brought into communication with the dynamic pressure source in its inoperative conditions. Since this method is well-known from many publications (such as U.S. Pat. No. 4,606,585), description of its details, such as a failsafe piston for deactivating a check valve in case of the dynamic pressure source failure, is omitted.

In this embodiment, the dynamic pressure line is assumed to be connected to the driving wheels. The pressure fluid of the dynamic pressure source is introduced into a wheel brake 17 through a changeover valve 26 for traction control and a flow control valve 25 controls the brake pressure in both antilock and traction control phases. As the flow control valve 25 in the dynamic pressure line, one proposed by the present applicant in Japanese Patent Application 1-154869 may be used.

Depending upon the type of flow control valve 25, a check valve may be provided in parallel to the valve 25 so that the brake pressure should follow and drop sharply if the pedal is released abruptly during antilock control.

A pedal stroke sensor 28 is provided on the pedal 1 or a member associated therewith. Each wheel is provided with a wheel speed sensor (not shown). A vehicle acceleration/deceleration sensor and/or pressure sensor for various parts may further be added. The sensors and the control valves are connected to an electronic control unit 29 (wiring is not shown).

Figure 2:
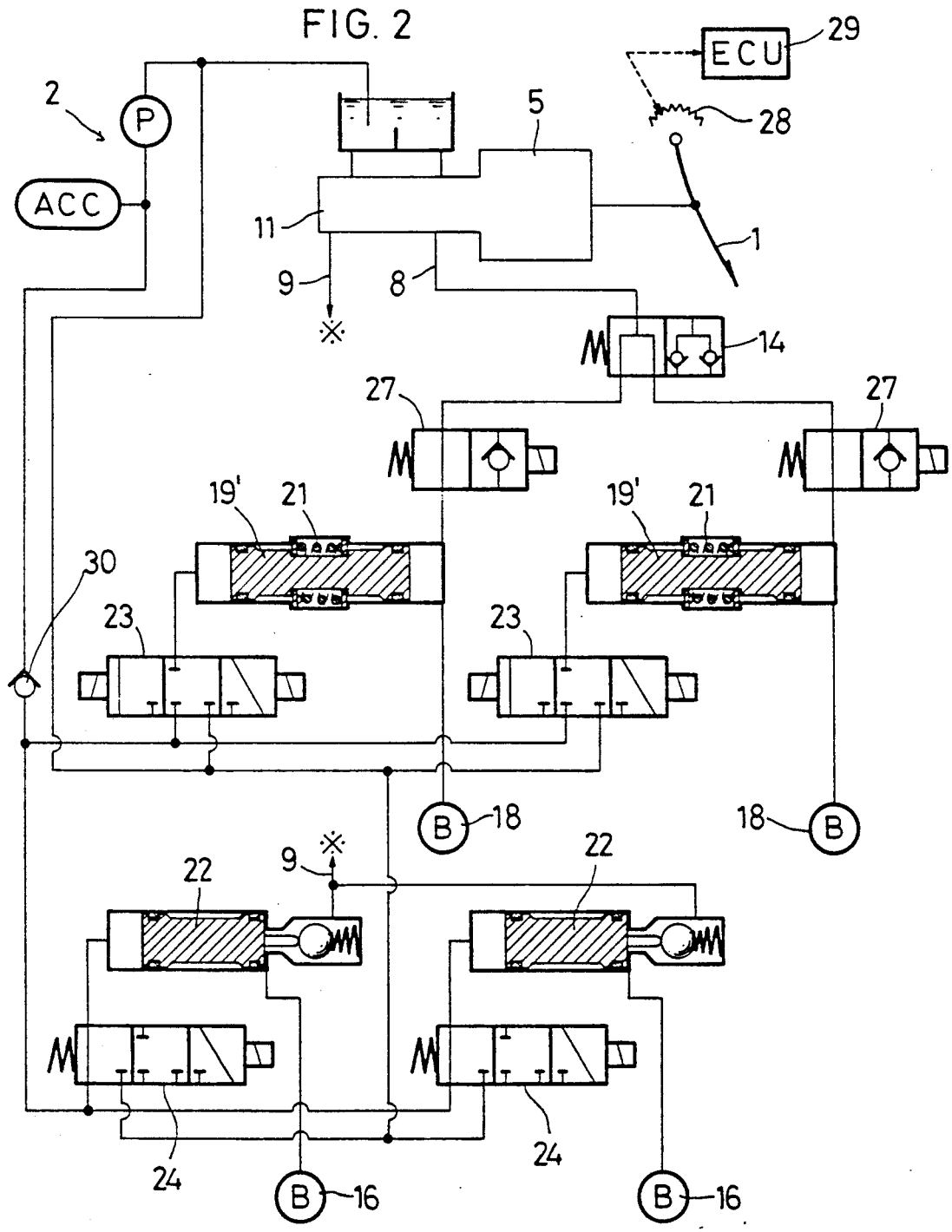
FIG. 2 is a circuit diagram of a second embodiment.

FIG. 2 shows an example in which a tandem master cylinder is used to supply static pressure to both lines.

Since it is not necessary to output dynamic pressure, the booster 5 may be a hydraulic booster or a vacuum booster. The outputs of the tandem master cylinder 11 are given to a first static pressure line 8 and a second static pressure line 9.

In this embodiment, an antilock changeover valve 14 in the first static pressure line 8 is made by integrating two pairs of changeover valves 12 and check valves 13 shown in FIG. 1.

In this figure, it is assumed that the driving wheels are included in one line only. In this case, it is advantageous to provide the brakes for the driving wheels in the first static pressure line 8, which is located nearer to the pedal push rod, if it is desired to add a traction control function. This is because it is desirable to provide the bilateral driving piston 19 in the first static pressure line in order to maintain the pedal stroke control even while the other line is malfunctioning.

A traction control changeover valve 27 is provided for each driving wheel brake 18 and differs in construction from the changeover valve 26 shown in FIG. 1.

A bilateral driving piston 19" in this embodiment differs from the one shown in FIG. 1. It has a return spring 21.

As shown in the figure, the return spring 21 may be a single spring provided between spring supports loosely fitted on a small-diameter portion of the piston 19' and capable of urging the piston in both ways. However it may also comprise two springs, one for biasing the piston in one direction and the other in the other direction.

The biasing force of the return spring 21 should be as small as possible, as long as it can overcome the sliding resistance of the bilateral piston.

A unilateral driving piston 22 for antilock control only and a flow control valve 24 may also be used in the second static pressure line of the second embodiment.

If both lines each include one driving wheel, it is preferable to use:

members 12, 13, 27, 19 and 23 for the driving wheel brake side in the static pressure line, members 22 and 24 for the non-driving wheel brake side in the static pressure line (it is of course possible to use members 12, 13, 19 and 23), members 26 and 25 for the driving wheel brake side in the dynamic pressure line, and members 25 for the non-driving wheel brake side in the dynamic pressure line. Of course, any of the system configurations may be freely combined with any of the methods for returning the bilateral driving piston 19 to its neutral position (20 or 21). Also, any of the parts may be provided separately or combined with any of the other parts.

Next, the operation of the embodiments will be described.

The operation of other parts than the bilateral driving piston is well-known in the art and its description is omitted.

While the pedal is not operated, if the stroke sensor 20 is provided, the bilateral driving piston 19 is controlled by the flow control valve 23 so as to be kept in a predetermined neutral position. If the return spring 21 is provided, the control pressure is kept at zero by the flow control valve 23 so that the driving piston 19' will be moved by the return spring 21 back to its neutral position and kept in this position.

Non-operation would be judged not only based on instantaneous values of the pedal stroke sensor 28 but taking into consideration the behavior of the pedal stroke and that of the vehicle deceleration.

When the pedal 1 is operated, the bilateral driving piston 19 is controlled by the flow control valve 23 to move in such a direction as to reduce the capacity of the static pressure line so that the measurement of the pedal stroke sensor 28 will be in a predetermined relation with the deceleration of the vehicle. This reduces the pedal stroke in normal conditions in any desired manner. If the amount of reduction in the capacity of the static pressure line is detectable, the pedal stroke in normal conditions may be reduced by controlling the relation between the pedal stroke and the piston stroke. Further, if a pressure sensor is provided, it may be reduced by controlling the relation between the pressure in the static pressure line or the dynamic pressure line and the pedal stroke or the piston stroke.

When the antilock control starts, the output of the static pressure line will be separated from the wheel brakes by the changeover valve 12 or 14. Thereafter, antilock control is continued by moving the driving piston 19 by means of the flow control valve 23.

One problem with a prior art brake system is that in using the unilateral driving piston 22 for antilock control only, if you try to increase the brake pressure above the pressure at which the antilock control began, the check valve is opened and the brake pressure tends to increase sharply if the master cylinder pressure has been increased at that time. This will make the control temporarily rough. Use of the bilateral driving piston 19 can solve this problem because it can operate in such a direction as to reduce the capacity of the static pressure line even after the brake pressure has recovered to the level of the pressure at the beginning of antilock control. In order to take full advantage of this merit, it is preferable to use the bilateral driving pistons 19 for all the brakes in the static pressure lines. But the cost factors should be taken into consideration.

If the front wheels, to which a larger braking force is distributed, are driving wheels, the use of bilateral driving pistons for the front wheels will improve the cost performance ratio, including traction control.

A known method of traction control is applicable in the embodiment shown in FIG. 1. The brake pressure is controlled by use of the flow control valve 25 for antilock after introducing the pressure fluid of dynamic pressure source through the changeover valve 26 in the dynamic pressure line.

In the case of FIG. 2, after activating the check valve by actuating the changeover valves 27 in the static pressure lines including the bilateral driving pistons 19', the bilateral driving pistons are controlled by the flow control valves 23 in such a direction as to reduce the capacity of the static pressure lines and thus to obtain a desired brake pressure. One advantage of this method is its high responsiveness when the brake pedal is depressed further during traction control. In the embodiment of FIG. 1, only the non-driving wheel brakes can respond instantly when the pedal is depressed further.

The check valve 30 is provided to prevent the bilateral driving piston 19 from being pushed back toward the dynamic pressure source side when the pressure in the static pressure line increases above the pressure of the dynamic pressure source while the capacity of the static pressure line is being controlled to reduce. Such a check valve may be built in each flow control valve 23 to simplify the piping.

What is claimed is:

1. A brake system, comprising:
    at least one wheel brake;
    a static pressure line connected to said wheel brake, said static pressure line having a static pressure generator operated by a manual control input device having a manual control stroke for generating a brake pressure;
    a fluid pressure source connected to a control pressure line;
    a bilateral driving piston having a first end fluidly connected to said static pressure line and a second end fluidly connected to said control pressure line, said bilateral driving piston having a neutral position and being moveable in the direction of said first end decreasing a volume of said static pressure line and in the direction of said second end increasing the volume of said static pressure line;

a flow control valve fluidly connected to said control pressure line controlling the position of said bilateral driving piston;

a changeover valve in said static pressure line between said bilateral driving piston and said static pressure generator for selectively shutting off a fluid flow from said static pressure generator to said wheel brake when activated and not shutting off the fluid flow end deactivated; and an electronic control means controlling said flow control valve and said changeover valve in at least a non-operation phase in which no operational input is applied to said manual control input device, a normal operation phase in which an operational input is applied to said manual control input device by a manual control stroke, and an antilock control phase, such that in said non-operation phase said changeover valve is deactivated and said flow control valve maintains said bilateral driving piston in said neutral position, in said normal operation phase said changeover valve is deactivated and said flow control valve causes said bilateral driving piston to move from said neutral position to decrease the volume of said static pressure line to offset a portion of an expansion in said wheel brake so as to shorten the manual stroke of said manual control input device, and in said antilock control phase said changeover valve is activated and said flow control valve causes said bilateral piston to increase the volume of said static pressure line to thereby decrease the fluid pressure in said wheel brake.

2. The brake system of claim 1, wherein said bilateral driving piston has a position sensor for detecting at least said neutral position of said bilateral driving piston providing a signal to said electronic control means such that said bilateral driving piston is maintained at said neutral position in said non-operation phase.

3. The brake system of claim 1, wherein said bilateral driving piston has a biasing spring for restoring said bilateral driving piston to said neutral position when no pressure is applied on either end of said bilateral driving piston and said flow control valve is controlled by said electronic control means so that, when no brake pressure is generated by said manual control input device, no control pressure is provided in said second end of said bilateral driving piston in said non-operation phase.

4. The brake system of any one of claims 1-3, and further comprising a second changeover valve, wherein:

said wheel brake is a brake for a driving wheel;

said second changeover valve is provided in said static pressure line between said bilateral driving piston and said static pressure generator for shutting off a fluid flow from said wheel brake to said static pressure generator when activated; and said electronic control means controls said flow control valve and said second changeover valve in an automatic braking control phase such that in said automatic braking control phase said second changeover valve is activated and said flow control valve is controlled so that said bilateral piston decreases the volume of said static pressure line, thereby generating and controlling a fluid pressure in said wheel brake.

5. The brake system of any one of claims 1-3, wherein said electronic control means has a stroke sensor for detecting said manual control stroke of said manual control input device for controlling said bilateral driving piston in said normal operation phase to maintain a predetermined relationship between said manual control stroke and deceleration.

6. The brake system of any one of claims 1-3, wherein said electronic control means in said normal operation phase controls said bilateral driving piston such that a stroke of said bilateral driving piston in said direction reducing the volume of said static pressure line is in a predetermined relationship with deceleration, thus effecting a predetermined relationship between said manual control stroke and the deceleration.

7. The brake system of any one of claims 1-3, wherein said electronic control means:

has a stroke sensor for detecting said manual control stroke of said manual control input device; and controls said flow control valve to control said bilateral driving piston in said normal operation phase such that a stroke of said bilateral driving piston in said direction reducing the volume of said static pressure line is in a predetermined relationship with said manual control stroke of said manual control input device, thus a predetermined relationship between said manual control stroke and deceleration.

8. The brake system of any one of claims 1-3, wherein said electronic control means:

has a pressure sensor for detecting a fluid pressure corresponding to the manual control force of said manual control input device; and controls said flow control valve to control said bilateral driving piston in said normal operation phase such that a stroke of said bilateral driving piston in said direction reducing the volume of said static pressure line is in a predetermined relationship with the manual control force, thus effecting a predetermined relationship between said manual control stroke and deceleration.

9. The brake system of any one of claims 1-3, wherein said static pressure generator is a tandem master cylinder, a second static pressure line is connected to said tandem master cylinder and a said bilateral driving piston is provided in at least one said static pressure line corresponding to the master cylinder chamber located closer to the manual control end of said tandem master cylinder.

* * * * *